US005885698A

United States Patent [19]

Takehana et al.

[11] Patent Number: 5,885,698

[45] Date of Patent: Mar. 23, 1999

[54] ELECTROPHOTOGRAPHIC IMAGE-RECEIVING FILM

[75] Inventors: Tadashi Takehana; Yoshio Tani, both of Fujinomiya; Kiyoshi Hosoi; Katsumi Harada, both of Ebina, all of Japan

[73] Assignee: Fuji Xerox Co., Ltd., Tokyo, Japan

[21] Appl. No.: 685,096

[22] Filed: Jul. 22, 1996

[30] Foreign Application Priority Data

Jul. 27, 1995 [JP] Japan .................................... 7-210999

[51] Int. Cl.[6] ................................ B32B 7/02; B32B 5/16; B32B 7/12; B32B 7/04

[52] U.S. Cl. .......................... 428/212; 428/216; 428/328; 428/329; 428/330; 428/331; 428/336; 428/420; 428/421; 428/480; 428/683

[58] Field of Search ........................ 430/58, 63; 428/220, 428/328, 329, 331, 336, 420, 421, 480, 483, 212, 216; 96/87 A, 84 R

[56] References Cited

U.S. PATENT DOCUMENTS

| | | | |
|---|---|---|---|
| 3,874,878 | 4/1975 | Rasch et al. | 96/87 A |
| 3,938,999 | 2/1976 | Yoneyama et al. | 96/84 R |
| 4,078,935 | 3/1978 | Nakagiri et al. | 96/87 A |
| 4,420,528 | 12/1983 | Okiyama | 428/220 |
| 5,021,309 | 6/1991 | Robert | 430/58 |
| 5,229,188 | 7/1993 | Takeuchi et al. | 428/195 |
| 5,352,553 | 10/1994 | Takeuchi et al. | 430/42 |

FOREIGN PATENT DOCUMENTS

| | | |
|---|---|---|
| A-48-75240 | 10/1973 | Japan . |
| A-58-112735 | 7/1983 | Japan . |
| A-1-315768 | 12/1989 | Japan . |
| A-6-19179 | 1/1994 | Japan . |

*Primary Examiner*—Ponnathapura Achutamurthy
*Assistant Examiner*—Hankyel T. Park
*Attorney, Agent, or Firm*—Oliff & Berridge, PLC

[57] ABSTRACT

An electrophotographic image-receiving film is disclosed which comprises an transparent support having on one side thereof an image-receiving layer, said support having on the other side thereof a back layer comprising an electroconductive undercoat layer and an antifriction layer having a reduced coefficient of friction. The electrophotographic image-receiving film has excellent running properties and excellent antiblocking properties.

20 Claims, 1 Drawing Sheet

ELECTROPHOTOGRAPHIC IMAGE-RECEIVING FILM

FIELD OF THE INVENTION

The present invention relates to a transparent electrophotographic image-receiving film suitable for use in forming an image for projection using an indirect dry electrophotographic plain-paper copier, a full-color electrophotographic copier, or various printers. In particular, this invention relates to an electrophotographic image-receiving film usable for OHPs (overhead projectors).

BACKGROUND OF THE INVENTION

The technique of using an electrophotographic image-receiving film (hereinafter sometimes referred to as "transparent film") in place of plain paper to form a toner image with an indirect dry electrophotographic plain-paper copier and projecting the toner image with an OHP (overhead projector) to give a projected image (transmitted image) is extensively used as a method for easily obtaining a projected image. In particular, with the recent spread of indirect dry full-color electrophotographic copiers and various printers, the technique of forming a color image on a transparent film and projecting the image with an OHP to obtain a projected image has also come to be used extensively. Because of this, there is a demand for an electrophotographic image-receiving film which not only is capable of giving a projected image with excellent color tones but also has satisfactory handleability with excellent film traveling properties (running properties).

However, the conventionally used electrophotographic image-receiving films for monochromic (black-and-white) indirect dry electrophotographic copiers still have many problems in film traveling properties (running properties), although improved in toner fixability, etc. For example, in the case where electrophotographic image-receiving films (OHP films) are fed to an indirect dry full-color electrophotographic copier through a tray for manual paper feed, multiple feeding (the phenomenon in which two or more OHP films are fed simultaneously) and miss feeding (the phenomenon in which no OHP film is fed) occur frequently. OHP films are usually fed through a manual-feed tray because each original is rarely copied onto two or more OHP films. In the case of color copying, the transfer drum makes four revolutions to transfer toners of four colors to an OHP film, and the OHP film is passed on a transport plate disposed between the transfer drum and fixing rolls and then inserted between the fixing rolls in order to fix the transferred toners. In this operation, the OHP film frequently adheres to the transport plate and bends, making the insertion thereof impossible. Although the transport plate is usually a resin-coated metal plate having excellent slip properties so as to enable smooth insertion between the fixing rolls, the OHP film which has undergone the transfer step described above is apt to arouse the above-described trouble concerning insertion between the fixing rolls.

The conventionally used electrophotographic image-receiving films for monochromic (black-and-white) indirect dry electrophotographic copiers have an image-receiving layer (usually on each side of the support) which contains any of various matting agents and an antistatic agent so as to improve the traveling properties (running properties) of the films (JP-A-58-112735, JP-A-1-315768, and JP-A-6-19179). (The term "JP-A" as used herein means as "unexamined published Japanese patent application.") Used as the matting agents are beads of poly(methyl methacrylate), polyethylene, polytetrafluoroethylene, and the like and fine particles of $SiO_2$ and other inorganic substances.

In JP-A-48-75240 is disclosed an electrophotographic image-receiving film comprising a support, an image-receiving layer formed on the front side of the support, and an antistatic layer formed on the back side thereof which contains an antistatic agent (e.g., an alkylbenzimidazole-sulfonic acid salt).

Even though electrophotographic image-receiving films designed to have improved slip and antistatic properties like the electrophotographic image-receiving film described in the above-cited reference are used, it is difficult to eliminate troubles in indirect dry full-color electrophotographic copiers, such as the multiple feeding and miss feeding which can occur when electrophotographic image-receiving films are fed through a manual-feed tray and the failure of insertion between fixing rolls due to film adhesion to a transport plate disposed before the fixing rolls and due to the resulting film bending.

SUMMARY OF THE INVENTION

An object of the present invention is to provide an electrophotographic image-receiving film having excellent running properties.

Another object of the present invention is to provide an electrophotographic image-receiving film which combines excellent running properties and excellent antiblocking properties.

In particular, an object of the present invention is to provide an electrophotographic image-receiving film which has excellent running properties and is for use in forming a color toner image thereon.

A further object of the present invention is to provide an electrophotographic image-receiving film which shows excellent running properties when used for copying in an indirect dry electrophotographic copier, a full-color electrophotographic copier, or various printers.

The above objects are accomplished with an electrophotographic image-receiving film comprising a transparent support having on one side thereof an image-receiving layer, said support having on the other side thereof a back layer comprising an electro-conductive undercoat layer and an antifriction layer having a reduced coefficient of friction.

Preferred embodiments of the electrophotographic image-receiving film of the present invention are as follows.

(1) The back layer has a coefficient of static friction of 0.30 or lower.

(2) The back layer has a surface tension of 36 dyn/cm or lower.

(3) The antifriction layer comprises a polyolefin or a copolymer containing olefin units.

(4) The electro-conductive undercoat layer comprises metal oxide particles having a particle diameter of 0.2 $\mu$m or smaller and a polymer.

(5) The back layer has a surface resistivity as measured at 25° C. and 65% RH of from $1\times10^{10}$ to $1\times10^{14}$ $\Omega$.

(6) The electrophotographic image-receiving film is for use in the formation of a color image.

(7) The image-receiving layer comprises a polyester comprising repeating units derived from a dibasic acid ingredient which comprise units of at least one dicarboxylic acid selected from the group consisting of terephthalic acid and 2,6-naphthalenedicarboxylic acid and units of a sulfobenzenedicarboxylic acid and repeating units derived from a dihydric alcohol ingredient which comprise ethylene glycol units, triethylene glycol units, and units of an adduct of bisphenol A with ethylene oxide.

(8) In the polyester in (7) above, the repeating units derived from a dibasic acid ingredient comprise from 60 to 95 mol % units of at least one dicarboxylic acid selected from the group consisting of terephthalic acid and 2,6-naphthalenedicarboxylic acid and from 5 to 17 mol % units of a sulfobenzenedicarboxylic acid, and the repeating units derived from a dihydric alcohol ingredient comprise from 10 to 60 mol % ethylene glycol units, from 30 to 90 mol % triethylene glycol units, and from 5 to 40 mol % units of an adduct of bisphenol A with ethylene oxide.

(9) In the polyester in (7) above, the repeating units derived from a dibasic acid ingredient comprise from 60 to 95 mol % terephthalic acid units, from 0 to 35 mol % isophthalic acid units, and from 5 to 17 mol % sulfobenzenedicarboxylic acid units.

(10) In the polyester in (7) above, the repeating units derived from a dibasic acid ingredient comprise from 0 to 35 mol % isophthalic acid units, from 60 to 95 mol % 2,6-naphthalenedicarboxylic acid units, and from 5 to 17 mol % sulfobenze niedicarboxylic acid units.

(11) In the polyester in (7) above, the repeating units derived from a dibasic acid ingredient comprise from 0 to 90 mol % terephthalic acid units, from 0 to 35 mol % isophthalic acid units, from 10 to 90 mol % 2,6-naphthalenedicarboxylic acid units, and from 5 to 17 mol % sulfobenzenedicarboxylic acid units.

(12) The image-receiving layer further contains a surfactant and a matting agent.

(13) The image-receiving layer has a surface resistivity as measured at 25° C. and 65% RH of from $1\times10^{10}$ to $1\times10^{14}\Omega$.

(14) The image-receiving layer has a thickness of from 1 to 8 $\mu$m.

(15) The transparent support comprises poly(ethylene terephthalate).

The electrophotographic image-receiving film described above can be advantageously used in a color image formation process which comprises:

repeating the following steps (1) to (3):

(1) image-wise exposing a photoreceptor surface to form a latent image;

(2) developing the latent image with one of two or more toners for color image formation which comprise a colorant and a binder resin to thereby form a toner image on the photoreceptor surface; and (3) transferring the image to the image-receiving layer of the electrophotographic image-receiving film, the number of repetitions of these steps being equal to the number of the toners, to thereby transfer a color image to the electrophotographic image--receiving film; and pressing the transferred toner image against the film with a roll heated to a fixing temperature for the toners to thereby fix the color image to the electrophotographic image-receiving film.

DETAILED DESCRIPTION OF THE INVENTION

Figure 1:
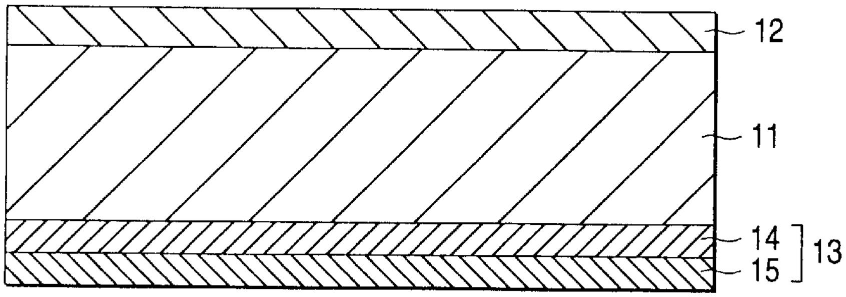
FIG. 1 is a schematic sectional view illustrating the constitution of a representative example of the electrophotographic image-receiving film of the present invention.

The electrophotographic image-receiving film of the present invention basically comprises a transparent support, an image-receiving layer formed on one side of the support, and a back layer formed on the other side. In FIG. 1 is shown a schematic sectional view illustrating the constitution of a representative example of the electrophotographic image-receiving film of the present invention.

The electrophotographic image-receiving film shown in FIG. 1 comprises a transparent support 11, an image-receiving layer 12 formed on one side of the transparent support 11, and a back layer 13 formed on the other side of the transparent support 11. The back layer 13 is composed of an electro-conductive undercoat layer 14 and an antifriction layer 15 having a reduced coefficient of friction, the electro-conductive undercoat layer 14 being disposed on the transparent support and the antifriction layer 15 being disposed on the layer.14. The electro-conductive undercoat layer 14 mainly serves to inhibit the electrostatic buildup which usually results when an electrophotographic image-receiving film is transported through a copier and to control the charge necessary for toner transfer. The antifriction layer 15 serves to reduce the coefficient of friction between electrophotographic image-receiving films (i.e., between the back layer and the image-receiving layer) or between the back layer and the transport member surfaces in a copier which come into contact with the back layer during film transportation. Due to the functions of the two layers, electrophotographic image-receiving films which have excellent running properties and hardly undergo blocking can be obtained.

Figure 2:
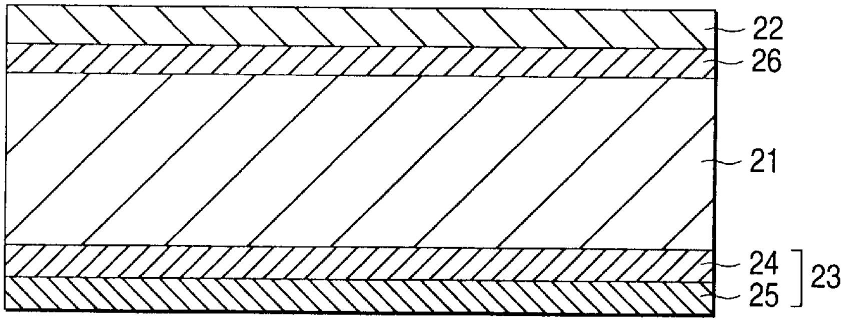
FIG. 2 is a schematic sectional view illustrating the constitution of another representative example of the electrophotographic image-receiving film of the present invention.

In FIG. 2 is shown a schematic sectional view illustrating the constitution of another representative example of the electrophotographic image-receiving film of the present invention.

The electrophotographic image-receiving film shown in FIG. 2 comprises a transparent support 21, an electro-conductive undercoat layer 26 formed on one side of the support 21, an image-receiving layer 22 formed on the electro-conductive undercoat layer, and a back layer 23 formed on the other side of the transparent support 21. The back layer 23 is composed of an electro-conductive undercoat layer 24 and an antifriction layer 25 having a reduced coefficient of friction, the electro-conductive undercoat layer 24 being disposed on the transparent support and the antifriction layer 25 being disposed on the layer 24.

The transparent supports 11 and 21 may be made of any material, as long as the material is transparent and withstands the radiation heat to which the material is exposed when used as an OHP film support. Examples of such materials include polyesters such as poly(ethylene terephthalate); cellulose esters such as nitrocellulose, cellulose acetate, and cellulose acetate butyrate; and other polymers such as polysulfones, poly(phenylene oxide), polyimides, polycarbonates, and polyamides. Films obtained from these materials preferably withstand a temperature of at least 100° C. Preferred of those films are poly(ethylene terephthalate) films because they are superior in heat resistance and transparency. Although the thicknesses of those films are not particularly limited, films from 50 to 200 μm thick are preferred from the standpoint of handleability.

Plastic films which do not withstand a temperature of 100° C. tend to deform during thermal toner fixing and are hence apt to wave. It is preferred to use films which have a sufficient thickness so as to be less apt to wrinkle when softened by the heat applied for fixing. Consequently, the thickness thereof is preferably 50 μm or larger, more preferably 75 μm or larger. The upper limit of the film thickness is preferably 200 μm, more preferably 150 μm, from the standpoint of avoiding a large decrease in light transmission. Therefore, the thickness of the heat-resistant plastic films is preferably from 50 to 200 μm, preferably from 75 to 150 μm.

The image-receiving layers 12 and 22 comprise a polymer generally having a glass transition temperature of 35° C. or higher (preferably from 45° to 120° C.). Examples of the polymer include polyester resins, polyether resins, acrylic resins, epoxy resins, urethane resins, amino resins, and phenolic resins. Of these, water-dispersible polymers described below are preferred.

In the case where the image-receiving layer is used for receiving toners of four colors, i.e., in the case where such color toners should be transferred and fixed to the image-receiving layer, this image-receiving layer should be made of a polymer having a high cohesive energy. Such a polymer is preferably a polyester comprising repeating units derived from a dibasic acid ingredient which comprise units of at least one dicarboxylic acid selected from the group consisting of terephthalic acid and 2,6-naphthalenedicarboxylic acid, and units of a sulfobenzenedicarboxylic acid; and repeating units derived from a dihydric alcohol ingredient which comprise ethylene glycol units, triethylene glycol units, and units of an adduct of bisphenol A with ethylene oxide.

The polyester described above has an advantage that since it softens moderately at a toner fixing temperature, toner particles are forced into the image-receiving layer, whereby a fixed image having an almost flat surface can be obtained. In addition, due to the use of the polyester described above, the toner and the image-receiving layer form almost no distinct interface therebetween because the toner and the image-receiving layer (the polyester) blend with each other at the interface therebetween. As a result, the light emitted from an overhead projector undergoes little refraction, so that a clear projected image having excellent color tones can be obtained.

In the polyester described above, the repeating units derived from a dibasic acid ingredient preferably comprise from 60 to 95 mol % units of at least one dicarboxylic acid selected from the group consisting of terephthalic acid and 2,6-naphthalenedicarboxylic acid and from 5 to 17 mol % units of a sulfobenzenedicarboxylic acid, and the repeating units derived from a dihydric alcohol ingredient preferably comprise from 10 to 60 mol % ethylene glycol units, from 30 to 90 mol % triethylene glycol units, and from 5 to 40 mol % units of an adduct of bisphenol A with ethylene oxide. The polyester having such a composition is a water-dispersible polymer. The term "water-dispersible polymer" means a polymer which is readily dispersed into water to give a dispersion capable of retaining the dispersion state over long.

In producing the polyester described above, the sulfobenzenedicarboxylic acid or an alkyl or hydroxyalkyl ester thereof is used in an amount of preferably from 5 to 17 mol %, more preferably from 6 to 15 mol %, based on the total amount of the dibasic acid ingredient.

In the sulfobenzenedicarboxylic acid or alkyl or hydroxyalkyl ester thereof described above, examples of the hydroxyalkyl include hydroxyethyl, hydroxypropyl, hydroxyisopropyl, and hydroxybutyl, and examples of the alkyl include methyl, ethyl, isopropyl, propyl, and butyl. Preferred of these is hydroxyethyl. The sulfo group is preferably in the form of the sodium, potassium, or lithium salt, more preferably sodium salt.

The sulfobenzenedicarboxylic acid and alkyl or hydroxyalkyl ester thereof is preferably either an isophthalic, terephthalic, or phthalic acid having a metal sulfonate group or a lower alkyl or lower hydroxyalkyl ester of the substituted acid, and is more preferably either an isophthalic acid having a metal sulfonate group or a lower alkyl or lower hydroxyalkyl ester of the substituted isophthalic acid. Especially preferred is a methyl or hydroxyethyl ester of an isophthalic acid having a metal sulfonate group.

The adduct of bisphenol A with ethylene oxide preferably contains from 1 to 5 mol (more preferably from 1 to 2 mol) of ethylene oxide units per 1 mol of bisphenol A.

The polyester described above preferably has a number-average molecular weight of from 1,500 to 5,000 and a weight-average molecular weight of from 2,500 to 15,000. The polyester preferably has a (weight-average molecular weight)/(number-average molecular weight) ratio of from 1.2 to 3.0.

The image-receiving layer may contain a matting agent. Since the addition of a matting agent is effective in improving slip properties, it produces a satisfactory effect also on abrasion resistance and marring resistance.

Examples of materials usable as the matting agent include fluororesins, low-molecular weight polyolefin organic polymers (e.g., polyethylene matting agents, paraffin wax emulsions, and microcrystalline wax emulsions), nearly spherical beads of plastics (e.g., crosslinked PMMA, polycarbonates, poly(ethylene terephthalate), polyethylene, and polystyrene), and fine inorganic particles (e.g., $SiO_2$, $Al_2O_3$, talc, and kaolin).

The content of the matting agent is preferably from 0.1 to 10% by weight based on the amount of the polymer of the image-receiving layer.

The image-receiving layer preferably has a surface resistivity of from $1\times10^{10}$ to $1\times10^{14}$ Ω(under the conditions of 25° C. and 65% RH). If the image-receiving layer has a resistivity lower than $1\times10^{10}$ Ω, a sufficient amount of a toner cannot be transferred to the image-receiving layer of the electrophotographic image-receiving film, resulting in a toner image having a low density. On the other hand, if the image-receiving layer has a resistivity exceeding $1\times10^{14}$ Ω, excessive charge generation occurs during transfer, so that the toner is not transferred sufficiently, resulting in a reduced image density. In addition, electrophotographic image-receiving films containing such an image-receiving layer having a surface resistivity not within the above-specified range are apt not only to attract dust particles during handling due to electrostatic buildup, but also to arouse copying troubles such as miss feeling, multiple feeding, discharge marks, and toner transfer failures (blank areas).

A surfactant may be incorporated into the image-receiving layer in order to regulate the image-receiving layer so as to have a surface resistivity within the above-specified range, or for other purposes. Examples of the surfactant include alkylbenzeneimidazolesulfonic acid salts, naphthalenesulfonic acid salts, carboxylic acid sulfonic esters, phosphoric esters, heterocyclic amines, ammonium salts, phosphonium salts, amphoteric betaine salts, and metal oxides such as $ZnO$, $SnO_2$, $Al_2O_3$, $In_2O_3$, $MgO$, $BaO$, and $MoO_3$.

Known ingredients including colorants, ultraviolet absorbers, crosslinking agents, and antioxidants can be used in forming the image-receiving layer if desired and necessary, as long as the properties of the electrophotographic image-receiving film of the present invention are not impaired by these ingredients.

The image-receiving layer can be formed, for example, by dispersing or dissolving the ingredients shown above including a polymer, a matting agent, and an antistatic agent into water or an organic solvent, applying the resulting coating solution on the transparent support, and then drying the coating with heating. For applying the coating solution, any of known coating means may be used such as, e.g., an air doctor coater, blade coater, rod coater, knife coater, squeeze coater, reverse-roll coater, and bar coater.

The thickness of the image-receiving layer is preferably from 1 to 8 μm, more preferably from 2 to 6 μm. If the thickness thereof is smaller than 1 μm, it is difficult to sufficiently incorporate toner particles into the inside of the image-receiving layer, so that the resulting toner image is apt to have a rough surface in the half-tone region. If the thickness thereof exceeds 8 μm, the image-receiving layer is apt to suffer cohesive failure during fixing, so that an offset phenomenon is apt to occur.

If a desired surface resistivity is not imparted with the aforementioned surfactants to the electrophotographic image-receiving film described above comprising an image-receiving layer formed on a transparent support, another antistatic agent may be used in combination with the surfactants, or an electro-conductive undercoat layer may be formed between the transparent support and the image-receiving layer. This electro-conductive undercoat layer may be the same as that contained in the back layer described below.

In the electrophotographic image-receiving films of the present invention, a back layer 13 or 23 composed of an electro-conductive undercoat layer 14 or 24 and an antifriction layer 15 or 25 is formed on the transparent support on the side opposite to the image-receiving layer.

The electro-conductive undercoat layer is a layer comprising electro-conductive metal oxide particles dispersed in a polymer. Examples of the material of the electro-conductive metal oxide particles include $ZnO$, $TiO$, $SnO_2$, $Al_2O_3$, $In_2O_3$, $SiO_2$, $MgO$, $BaO$, and $MoO_3$. These materials may be used alone or in the form of a complex oxide thereof. These metal oxides preferably contain one or more other elements, and preferred examples of such oxides include $ZnO$ doped with Al, In, etc., $TiO$ doped with Nb, Ta, etc., and $SnO_2$ doped with Sb, Nb, halogens, etc. Especially preferred of these is $SnO_2$ doped with Sb. Such electro-conductive metal oxide particles preferably have a particle diameter of 0.2 μm or smaller, more preferably 0.1 μm or smaller. The ratio of the electro-conductive metal oxide particles to the polymer of the electro-conductive undercoat layer is from 10 to 0.1, preferably from 5 to 0.2.

Examples of polymeric materials usable for forming the electro-conductive undercoat layer include water-soluble polymers such as poly(vinyl alcohol), poly(acrylic acid), polyacrylamide, poly(hydroxyethyl acrylate), polyvinylpyrrolidone, water-soluble polyesters, water-soluble polyurethanes, water-soluble nylons, water-soluble epoxy resins, gelatin, hydroxyethyl cellulose, hydroxypropyl cellulose, carboxymethyl cellulose, and derivatives of these polymers; water-dispersible resins such as water-dispersible acrylic resins and water-dispersible polyesters; emulsions such as acrylic resin emulsions, poly(vinyl acetate) emulsions, and SBR (styrene/butadiene rubber) emulsions; and organic-solvent-soluble resins such as acrylic resins and polyester resins. Preferred of these are water-soluble polymers, water-dispersible resins, and emulsions. A surfactant such as those enumerated above may be added to these polymers. A crosslinking agent and other ingredients may also be added thereto.

The electro-conductive undercoat layer can be formed, for example, by dispersing or dissolving the ingredients shown above including electro-conductive metal oxide particles and a polymer into water or an organic solvent, applying the resulting coating solution on the transparent support, and then drying the coating with heating. For applying the coating solution, any of known coating means may be used such as, e.g., an air doctor coater, blade coater, rod coater, knife coater, squeeze coater, reverse-roll coater, and bar coater.

The thickness of the electro-conductive undercoat layer is preferably from 0.1 to 2 μm, more preferably from 0.1 to 1 μm.

On the electro-conductive undercoat layer is formed an antifriction layer having a reduced coefficient of friction. The antifriction layer comprises a polymer which provides a film with a low coefficient of static friction, and preferably further contains a matting agent and a surfactant.

Examples of the polymer having a low coefficient of static friction include polyolefins such as low-density polyethylene, low-molecular weight polyethylene, and polypropylene; (meth)acrylic acid/olefin copolymers (e.g., methacrylic acid/ethylene copolymers); vinyl acetate/olefin copolymers (e.g., vinyl acetate/ethylene copolymers); ionomers (e.g., metal methacrylate/ethylene copolymers (the metal is, e.g., Zn, Na, K, Li, Ca, or Mg, preferably Na or Zn)); fluororesins (e.g., polytetrafluoroethylene, polychlorotrifluoroethylene, and poly(vinylidene fluoride)); and fluorinated acrylic resins (e.g., polymers of methacrylic acid/fluoroalcohol esters). Preferred of these are polyolefins and copolymers containing olefin units (e.g., (meth)acrylic acid/olefin copolymers, vinyl acetate/olefin copolymers, and ionomers). Especially preferred are ionomers. It is preferred to use these resins in the form of an aqueous dispersion from the standpoint of production efficiency. In the case of using an aqueous dispersion of any of those resins, the dispersion preferably has such excellent film-forming properties that a film can be formed therefrom at a temperature of 150° C. or lower.

Although the antifriction layer is usually formed by applying a coating solution containing any of those polymers and drying the coating, it may also be formed by sticking a sheet of the polymer on the electro-conductive undercoat layer.

A matting agent is preferably contained in the antifriction layer. Since the addition of a matting agent is effective in improving slip properties, it produces a satisfactory effect also on abrasion resistance and marring resistance.

Examples of materials usable as the matting agent include fluororesins, low-molecular weight polyolefin organic polymers (e.g., polyethylene matting agents, paraffin wax emulsions, and microcrystalline wax emulsions), nearly spherical beads of plastics (e.g., crosslinked PMMA, polycarbonates, poly(ethylene terephthalate), polyethylene, and polystyrene), and fine inorganic particles (e.g., $SiO_2$, $A1_2O_3$, talc, and kaolin).

The content of the matting agent is preferably from 0.1 to 10% by weight based on the amount of the polymer of the antifriction layer.

A surfactant may be incorporated into the antifriction layer in order to regulate the surface resistivity of the back layer. Examples of the surfactant include alkylbenzeneimidazolesulfonic acid salts, naphthalenesulfonic acid salts, carboxylic acid sulfonic esters, phosphoric esters, heterocyclic amines, ammonium salts, phosphonium salts, amphoteric betaine salts, and metal oxides such as ZnO, $SnO_2$, $Al_2O_3$, $In_2O_3$, MgO, BaO, and $MoO_3$.

Known ingredients including colorants, ultraviolet absorbers, crosslinking agents, and antioxidants can be used in forming the antifriction layer if desired and necessary, as long as the properties of the electrophotographic image-receiving film of the present invention are not impaired by these ingredients.

The antifriction layer can be formed, for example, by dispersing or dissolving the ingredients shown above including a polymer, a matting agent, and an antistatic agent into water or an organic solvent, applying the resulting coating solution on the electro-conductive undercoat layer, and then drying the coating with heating. For applying the coating solution, any of known coating means may be used such as, e.g., an air doctor coater, blade coater, rod coater, knife coater, squeeze coater, reverse-roll coater, and bar coater.

In the case of using a polymer in the form of a dispersion, the coating solution applied should be heated for drying to a film-forming temperature for the polymer (usually about 80 to 150° C.). The heating time is generally from 10 seconds to 5 minutes.

The thickness of the antifriction layer is preferably from 0.1 to 10 $\mu$m, preferably from 0.2 to 5 $\mu$m.

The back layer comprising the electro-conductive undercoat layer and the antifriction layer preferably has a surface resistivity of from $1\times10^{10}$ to $1\times10^{14}\Omega$(more preferably from $1\times10^{11}$ to $5\times10^{13}$ $\Omega$; under the conditions of 25° C. and 65% RH). The resistivity of the back layer is regulated by controlling the composition and thickness of the electro-conductive undercoat layer. In addition, it can also be regulated in a small range by incorporating an antistatic agent into the antifriction layer. The back layer has a coefficient of static friction of preferably 0.30 or lower, more preferably from 0.10 to 0.30, particularly preferably from 0.10 to 0.20. The surface tension of the back layer is preferably 36 dyn/cm or lower, more preferably from 20 to 36 dyn/cm, particularly preferably from 20 to 28 dyn/cm. The values of the coefficient of static friction and surface tension of the back layer are governed almost exclusively by the properties of the antifriction layer.

By regulating the back layer so as to have a surface resistivity, a coefficient of static friction, and a surface tension within the respective ranges specified above, electrophotographic image-receiving films which have excellent running properties and hardly undergo blocking can be obtained. For example, the regulation concerning surface resistivity is highly effective in inhibiting the electrostatic buildup which usually results when an electrophotographic image-receiving film is transported through a copier. The regulation concerning the coefficient of static friction and that concerning surface tension are effective in greatly improving slip between electrophotographic image-receiving films (i.e., between the back layer and the image-receiving layer) or between the back layer and the transport member surfaces in a copier which come into contact with the back layer during film transportation.

A color image formation process which can be advantageously used in copying on the electrophotographic image-receiving film of the present invention will be explained next.

For use in an indirect dry full-color electrophotographic copier, toners which melt sharply are preferably employed because the toners for that copier are required to melt satisfactorily with heating and have good color mixing property. In view of a relationship with the image-receiving layer of the electrophotographic image-receiving film described above, the binder resin of the toners is preferably a polyester resin.

Toners can be produced, for example, by melt-kneading toner-forming ingredients such as a binder resin, e.g., a polyester, a colorant (a dye or pigment), and a charge control agent, pulverizing the mixture, and classifying the resulting particles.

The color image formation process is described below in detail.

Figure 3:
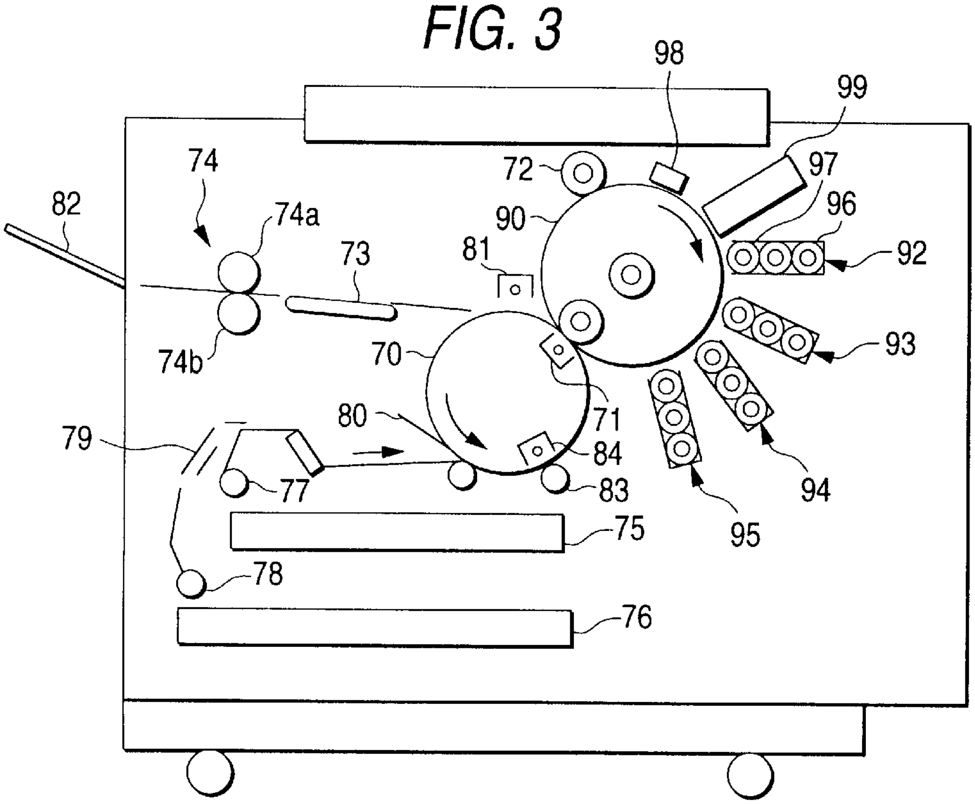
FIG. 3 is a schematic sectional view illustrating an example of full-color electrophotographic copiers capable of forming a full-color image and usable for the present invention.

In FIG. 3 is shown a schematic sectional view illustrating an example of electrophotographic copiers (apparatus) capable of forming a full-color image and usable for the present invention. The electrophotographic copier consists basically of a receiving material transport system which extends from a lower part of the copier main body to a nearly central part thereof, a latent-image-forming part which is located nearly at the center of the copier main body and close to a transfer drum 70 contained in the receiving material transport system, and a developing apparatus located close to the latent-image-forming part.

The receiving material transport system contains feed trays 75 and 76 disposed in a lower part of the copier main body, paper feed rollers 77 and 78 disposed nearly over the respective trays, and paper feed guides 79 and 80 disposed closed to those paper feed rollers. The system further contains a transfer drum 70 which is freely rotatable in the direction shown by the arrow and is equipped inside with a transfer device 71 and an electrode 84, a charging device 81 for receiving material separation which is located close by the outer periphery of the transfer drum 70, a contact roller 83 located in contact with that outer periphery, a transport plate 73, a fixing device 74 (comprising fixing rolls 74*a* and 74*b*) located close by the transport plate 73 on the side remote from the transfer drum 70, and a removable discharge tray 82.

The latent-image-forming part comprises an electrostatic latent-image holder (photoreceptor drum) 90 which is freely rotatable in the direction shown by the arrow and is disposed so that the outer periphery thereof is in contact with the outer periphery of the transfer drum 70, a charging device 98 located close by the outer periphery of the electrostatic latent-image holder, a writing device 99 having an irradiation means for image-wise exposure, e.g., a laser beam scanner, and a reflection means for image-wise exposure, e.g., a polygonal mirror, so as to form an electrostatic latent image on the outer periphery of the electrostatic latent-image holder, and a cleaning device 72.

The developing apparatus comprises developer holders 97 and housings 96. It has a black developing device 92, a magenta developing device 93, a cyan developing device 94, and a yellow developing device 95 which are disposed so as to face the outer periphery of the electrostatic latent-image holder 90 and so that electrostatic latent images formed on the outer periphery of the electrostatic latent-image holder are made visible (i.e., developed) thereby.

A sequence of image formation using an electrophotographic apparatus having the constitution described above is explained below using the full-color mode as an example. When the electrostatic latent-image holder 90 rotates in the direction shown by the arrow, the surface of the electrostatic latent-image holder is evenly charged by the changing device 98. After the even charging by the charging device 98, the writing device 99 forms an electrostatic image on the electrostatic latent-image holder 90 by means of laser light modulated based on black image signals sent according to an original (not shown in FIG. 3). The electrostatic latent image is then developed by the black developing device 92.

On the other hand, a receiving material (electrophotographic image-receiving film) transported from the feed tray 75 or 76 through the paper feed roller 77 or 78 and the paper feed guide 79 or 80 is electrostatically wound around the transfer drum 70 by means of the contact roller 83 and the electrode 84 facing the roller 83. The transfer drum 70 is rotating in the direction shown by the arrow at the same peripheral speed as the electrostatic latent-image holder 90. The visible image (unfixed toner image) formed through development by the black developing device 92 is transferred with the transfer device 71 at the part where the outer periphery of the electrostatic latent-image holder 90 is in contact with the outer periphery of the transfer drum 70. The transfer drum 70 continues rotating at the same speed for the transfer of a toner of the next color (magenta in FIG. 3).

The electrostatic latent-image holder 90, on the other hand, is treated with a charging device for erasion (not shown in FIG. 3) to remove any residual charges, subsequently cleaned by the cleaning device 72, and then recharged by the charging device 98. The recharged latent-image holder 90 is image-wise exposed based on magenta image signals as the second-stage signals to form an electrostatic latent image, which is made visible by the magenta developing device 93. The same process as described above is successively conducted with respect to each of cyan and yellow. After completion of the transfer of toners of the four colors, the residual charges in the multicolor visible image formed on the receiving material are removed by the charging device 81. The receiving material is then sent via the transport plate 73 to the fixing device 74, where the toners are fixed by means of heat and pressure. Thus, the sequence of full-color image formation is completed.

If an electrophotographic image-receiving film arouses a trouble concerning the running thereof when used in copying with the above-described electrophotographic copier capable of forming a full-color image, the trouble particularly occurs when the film is transported from the feed tray 75 or 76 with the paper feed roller 77 or 78, or when the film is sent from the transport plate 73 to the fixing rolls 74*a* and 74*b* for the fixing of the transferred toners. Since electrophotographic image-receiving films are frequently used as OHP films, they are frequently fed not automatically as in the above-described copier, but manually. In the case of manual feeding, troubles of multiple feeding and miss feeding are more apt to occur. The reasons for this may be as follows. In automatic feeding, the points which should be taken in account are limited to slip between the paper feed rollers (feed rollers) and the film surface, and the slip between films, because the copier in this case has a film-separating mechanism containing suction cups, side pressers, corner claws, and a scraper. In contrast, the film-separating mechanism is not provided for manual feeding, and the factors which influence film transportability include slip between films and slip between the film surface (back side) and the retard pad (disposed on the surface corresponding to the feed rollers of the manual-feed tray) as well as the coefficient of friction between the paper feed rollers and the film surface. Consequently, multiple feeding and miss feeding are apt to occur especially in manual feeding.

Since the electrophotographic image-receiving film of the present invention has a back layer with a low coefficient of friction and a low surface tension on the back side thereof, it hardly arouses the above-described troubles of multiple feeding, miss feeding, and film clogging around the transport plate (failure of insertion between the fixing rolls).

Indirect dry full-color electrophotographic copiers usable for the present invention are not limited to the copier described above (FIG. 3). Other usable copiers include: an indirect dry full-color electrophotographic copier in which electrostatic latent images for respective colors successively formed on an image holder are successively developed with toners of the respective colors, and the resulting toner images are first transferred electrostatically to a belt-form intermediate transfer member successively one upon another, following which the toner image formed on the intermediate transfer member by multiple transfer is secondly transferred to a recording medium by means of a biased transfer roll to which a voltage opposite to the charge of the toners is applied for transfer, whereby a color image is formed; an indirect dry full-color electrophotographic apparatus in which a step of forming a visible image is conducted two or more times using two or more developing devices to form a multicolor image on an image holder, and this multicolor image is transferred to a recording medium at a time to form a color image; and an indirect dry full-color electrophotographic copier in which image holders arranged in a row are used to form images thereon respectively, and the images are successively transferred to a recording medium transported with a transfer belt to thereby form a color image.

The present invention will be explained below in more detail by reference to the following Examples, but the invention should not be construed as being limited thereto.

EXAMPLE 1

A 100 $\mu$m-thick poly(ethylene terephthalate) film which had undergone heat setting after biaxial stretching was subjected to corona discharge treatment. A coating solution for forming an electro-conductive undercoat layer and a coating solution for forming an image-receiving layer were prepared according to the following formulations.

| Coating Solution for Image-receiving Layer: | |
|---|---|
| Aqueous dispersion of polyester resin having the composition shown below* (solid content, 20% by weight) | 75 parts by weight |
| Crosslinked PMMA matting agent (MR-7G; average particle diameter, 7 $\mu$m; manufactured by Soken Chemical & Engineering Co., Ltd., Japan) | 0.075 parts by weight |
| Surfactant (Sandet BL; manufactured by Sanyo Chemical Industries, Ltd., Japan; solid content, 44.6% by weight) | 0.13 parts by weight |
| Pure water | 24.8 parts by weight |

*Composition of the Polyester Resin

| Polyester Composition (mol %) | | | | | | Number-average molecular weight | Weight-average molecular weight |
|---|---|---|---|---|---|---|---|
| TP | NDC | SSIA | EG | TEG | BA | ($M_n$) | ($M_w$) |
| 10.0 | 90.0 | 10.0 | 20.0 | 60.0 | 10.0 | 2,130 | 3,670 |

(Remarks)
TP: terephthalic acid unit
IP: isophthalic acid unit
NDC: naphthalenedicarboxylic acid unit
SSIA: 5-sodiumsulfoisophthalic acid unit
EG: ethylene glycol unit
TEG: triethylene glycol unit
BA: unit of ethylene oxide mono-adduct of bisphenol A Preparation of the aqueous dispersion of the polyester resin having the above composition:

To 800 g of distilled water heated at 90° C. was added 200 g of the polyester with stirring with Disper (1,000 rpm). This mixture was continuously stirred at that temperature for 3 hours to obtain the aqueous polyester resin dispersion.

The coating solution for forming an image-receiving layer was applied to one side of the poly(ethylene terephthalate) film with a bar coater #12 at a coating speed of 105 m/min, and the coating was dried at 120° C. for 1 minute. The resulting dry coating had a thickness of 3.0 $\mu$m.

| Coating Solution for Electro-conductive Undercoat Layer: | |
|---|---|
| Water-soluble acrylic resin (Jurymer ET-410; manufactured by Nihon Junyaku Co., Ltd., Japan) | 1.55 parts by weight |
| Tin dioxide (SN-88; average particle diameter, 88 nm; manufactured by Ishihara Sangyo Kaisha, Ltd., Japan) | 1.80 parts by weight |
| Nonionic surfactant (EMALEX/NP8.5; manufactured by Nihon Emulsion Co., Ltd., Japan) | 0.125 parts by weight |
| Pure water | 96.4 parts by weight |

The coating solution for forming an electro-conductive undercoat layer was applied with a bar coater #2.4 to the poly(ethylene terephthalate) film on the side opposite to the image-receiving layer at a coating speed of 105 m/min, and the coating was dried at 120° C. for 1 minute. The resulting dry coating had a thickness of 0.15 $\mu$m.

| Coating Solution for Antifriction Layer: | |
|---|---|
| Aqueous dispersion of ethylene/methacrylic acid ionomer (Chemipearl S-120; manufactured by Mitsui Petrochemical Industries, Ltd., Japan; solid content, 27% by weight) | 3.00 parts by weight |
| Crosslinked PMMA matting agent (MR-2G-20-5; average particle diameter, 3 $\mu$m; manufactured by Soken Chemical & Engineering Co., Ltd.) | 0.04 parts by weight |
| Low-molecular weight polyolefin matting agent (Chemipearl W-100; average particle diameter, 3 $\mu$m; manufactured by Mitsui Petrochemical Industries, Ltd.) | 0.165 parts by weight |

-continued

| Coating Solution for Antifriction Layer: | |
|---|---|
| Surfactant (EMALEX NR8.5; manufactured by Nihon Emulsion Co., Ltd.) | 0.077 parts by weight |
| Pure water | 99.6 parts by weight |

The coating solution for forming an antifriction layer was applied to the electro-conductive undercoat layer with a bar coater #2.4 at a coating speed of 105 m/min, and the coating was dried at 120° C. for 1 minute. The resulting dry coating had a thickness of 0.4 $\mu$m.

Thus, an electrophotographic image-receiving film was produced which consisted of a poly(ethylene terephthalate) film, an image-receiving layer formed on one side thereof, and a back layer on the other side thereof composed of an electro-conductive undercoat layer and an antifriction layer.

EXAMPLE 2

A electrophotographic image-receiving film was produced in the same manner as in Example 1, except that an antifriction layer was formed as follows.

| Coating solution for Antifriction Layer: | |
|---|---|
| Low-density polyolefin (Chemipearl M-200; manufactured by Mitsui Petrochemical Industries, Ltd.; solid content, 40% by weight) | 10.00 parts by weight |
| Crosslinked PMMA matting agent (MR-2G-20-5; average particle diameter, 3 $\mu$m; manufactured by Soken Chemical & Engineering Co., Ltd.) | 0.04 parts by weight |
| Low-molecular weight polyolefin matting agent (Chemipearl W-100; average particle diameter, 3 $\mu$m; manufactured by Mitsui Petrochemical Industries, Ltd.) | 0.165 parts by weight |
| Surfactant (EMALEX NR8.5; manufactured by Nihon Emulsion Co., Ltd.) | 0.077 parts by weight |
| Pure water | 92.6 parts by weight |

The coating solution for forming an antifriction layer was applied to the electro-conductive undercoat layer with a bar coater #2.4 at a coating speed of 105 m/min, and the coating was dried at 140° C. for 1 minute. The resulting dry coating had a thickness of 2.0 $\mu$m.

Comparative Example 1

An electrophotographic image-receiving film was produced in the same manner as in Example 1, except that the antifriction layer was omitted.

Comparative Example 2

A electrophotographic image-receiving film was produced in the same manner as in Example 1, except that a layer was formed on the electro-conductive undercoat layer as follows.

| Coating Solution for a Layer on the Electro-conductive Undercoat Layer: | |
|---|---|
| Water-soluble acrylic resin (Jurymer ET-410; manufactured by Nihon Junyaku Co., Ltd.; solid content, 27% by weight) | 3.00 parts by weight |

-continued

| Coating Solution for a Layer on the Electro-conductive Undercoat Layer: | |
|---|---|
| Crosslinked PMMA matting agent (MR-2G-20-5; average particle diameter, 3 μm; manufactured by Soken Chemical & Engineering Co., Ltd.) | 0.04 parts by weight |
| Low-molecular weight polyolefin matting agent (Chemipearl W-100; average particle diameter, 3 μm; manufactured by Mitsui Petrochemical Industries, Ltd.) | 0.165 parts by weight |
| Surfactant (EMALEX NR8.5; manufactured by Nihon Emulsion Co., Ltd.) | 0.077 parts by weight |
| Pure water | 92.6 parts by weight |

The coating solution for forming a layer was applied to the electro-conductive undercoat layer with a bar coater #2.4 at a coating speed of 105 m/min, and the coating was dried at 120° C. for 1 minute. The resulting dry coating had a thickness of 0.4 μm.

Polyester Composition

The polyester composition shown above was determined from the results of analysis by $^1H$ NMR spectroscopy.

Number-average Molecular Weight and Weight-average Molecular Weight

The number-average molecular weight and weight-average molecular weight of the polyester were measured as follows.

A gel permeation chromatograph (SCL-6B, manufactured by Shimadzu Corp., Japan) and Shodex-KF804 as a GPC column were used. A sample having a concentration of 8 mg/ml (tetrahydrofuran) was injected in an amount of 15 μl, while passing a solvent (tetrahydrofuran) at a rate of 0.8 ml/min at 40° C. Polystyrene was used as a standard material.

The electrophotographic image-receiving films obtained were evaluated for the following properties by the following methods.

(1) Coefficient of Static Friction

The image-receiving layer surface and the surface of each electrophotographic image-receiving film were examined with a friction coefficient analyzer (HEIDON-14, manufactured by Shinto Kagaku Co., Ltd., Japan) under the conditions of 25° C. and 65% RH. Details of this measurement were as provided for in JIS K7125 (1987).

(2) Surface Tension (dyn/cm)

The image-receiving layer surface and the surface of each electrophotographic image-receiving film were examined with a surface tension analyzer (CA-A, manufactured by Kyowa Kaimen Kagaku Co., Ltd., Japan) under the conditions of 25° C. and 65% RH. For forming droplets, water and methylene iodide were used. Details of the method for this measurement were as described in D. K. Dwens & R. C. Wendt, *Journal of Applied Polymer Science*, Vol. 13, p. 1741, (1969).

(3) Surface Resistivity (Ω)

Measurement was made with an ohmmeter (TR-8601, manufactured by Advantest Corporation, Japan) under the conditions of 25° C. and 65% RH.

(4) Running Property

With respect to each of the electrophotographic image-receiving films obtained in the Examples and Comparative Examples given above, 100 sheets were manually fed to the indirect dry full-color electrophotographic copier shown in FIG. 3 to conduct copying. The number of sheets erroneously fed due to multiple feeding, the number of sheets which underwent miss feeding (failed to be fed), and the number of film clogging troubles which occurred at the transport plate were counted.

(5) Antiblocking Property

With respect to each of the electrophotographic image-receiving films obtained in the Examples and Comparative Examples given above, 100 sheets were piled up and allowed to stand for 48 hours under the conditions of 45° C. and 80% RH. The sheets were then evaluated for blocking as follows.

AA: All sheets were independent and free from blocking.

CC: Most sheets suffered blocking and almost all the 100 sheets had been united into one.

The results of the above measurements are shown in Table 1.

TABLE 1

| Evaluation Item | Example 1 | Example 2 | Comparative Example 1 | Comparative Example 2 |
|---|---|---|---|---|
| Image-receiving Layer | | | | |
| Coefficient of static friction | 0.525 | 0.525 | 0.525 | 0.525 |
| Surface tension (dyn/cm) | 48.7 | 48.7 | 48.7 | 48.7 |
| Resistivity (Ω) | $7 \times 10^{10}$ | $5 \times 10^{10}$ | $5 \times 10^{10}$ | $5 \times 10^{10}$ |
| Back Layer | | | | |
| Coefficient of static friction | 0.161 | 0.158 | 0.507 | 0.374 |
| Surface tension (dyn/cm) | 33.1 | 30.5 | 43.8 | 39.2 |
| Resistivity (Ω) | $3 \times 10^{12}$ | $3 \times 10^{12}$ | $2 \times 10^{9}$ | $9 \times 10^{9}$ |
| Running Property | | | | |
| Multiple feeding (number of sheets) | 0/100 | 1/100 | 53/100 | 18/100 |
| Miss feeding (number of sheets) | 1/100 | 0/100 | 41/100 | 12/100 |
| Clogging (number of sheets) | 0/100 | 0/100 | 30/100 | 19/100 |
| Antiblocking Property | AA | AA | CC | CC |

The electrophotographic image-receiving film of the present invention has an image-receiving layer on one side of a transport support and a back layer on the other side. The back layer, comprising an electro-conductive undercoat layer and an antifriction layer, has a adequate surface resistivity and a low coefficient of static friction. The electro-conductive undercoat layer serves mainly to inhibit the electrostatic buildup which usually results when an electrophotographic image-receiving film is transported through a copier, while the antifriction layer serves to reduce the coefficient of friction between electrophotographic image-receiving films (i.e., between the back layer and the image-receiving layer) or between the back layer and the transport member surfaces in a copier which come into contact with the back layer during film transportation. Due to these functions of the two layers, the electrophotographic image-receiving film of the present invention has excellent running properties and hardly undergoes blocking.

The electrophotographic image-receiving film described above can be advantageously used in a process for forming a color image thereon using an electrophotographic copier. In general, since toners of four colors are transferred to a film for forming a color image, the film makes four revolutions with the transfer drum and hence frequently suffers charging or deformation. Especially high running properties are therefore required of electrophotographic image-receiving films. The film of the present invention satisfies this requirement.

While the invention has been described in detail and with reference to specific embodiments thereof, it will be apparent to one skilled in the art that various changes and modifications can be made therein without departing from the spirit and scope thereof.

What is claimed is:

1. An electrophotographic image-receiving film comprising a transparent support having on one side thereof an image-receiving layer, said support having on the other side thereof a back layer comprising (1) an electro-conductive undercoat layer comprising electro-conductive metal oxide particles dispersed in a polymer an (2) an antifriction layer having a reduced coefficient of friction.

2. The electrophotographic image-receiving film as claimed in claim 1, wherein said back layer has a coefficient of static friction of not more than 0.30.

3. The electrophotographic image-receiving film as claimed in claim 1, wherein said back layer has a surface tension of not more than 36 dyn/cm under the condition of 25° C. and 65% RH.

4. The electrophotographic image-receiving film as claimed in claim 1, wherein the antifriction layer comprises a polyolefin or a copolymer containing olefin units.

5. The electrophotographic image-receiving film as claimed in claim 1, wherein the electro-conductive metal oxide particles have a particle diameter of not more than 0.2 $\mu$m and a polymer.

6. The electrophotographic image-receiving film as claimed in claim 1, wherein the back layer has a surface resistivity as measured at 25° C. and 65% RH of from $1\times10^{10}$ to $1\times10^{14}$ Ω.

7. The electrophotographic image-receiving film as claimed in claim 1, wherein the electro-conductive metal oxide particles are comprised of metal oxides selected from the group consisting of ZnO, TiO, $SnO_2$, $Al_2$ $O_3$, $In_3$, $SiO_2$, MgO, BaO, $MoO_3$ and complex oxides thereof.

8. The electrophotographic image-receiving film as claimed in claim 1, wherein the thickness of the electro-conductive undercoat layer is from 0.1 to 2 $\mu$m.

9. The electrophotographic image-receiving film as claimed in claim 1, wherein the antifriction layer comprises a polymer with a low coefficient of static friction selected from the group consisting of polyolefins, methacrylic acid/olefin copolymers, vinyl acetate/olefin copolymers, fluororesins, fluorinated acrylic resins, ionomers and mixtures thereof.

10. The electrophotographic image-receiving film as claimed in claim 9, wherein the antifriction layer further includes a matting agent, a surfactant or both.

11. The electrophotographic image-receiving film as claimed in claim 1, wherein the thickness of the antifriction layer is from 0.1 to 10 $\mu$m.

12. The electrophotographic image-receiving film as claimed in claim 1, wherein the image-receiving layer comprises a polyester comprising:

repeating units derived from a dibasic acid ingredient which comprise units of at least one dicarboxylic acid selected from the group consisting of terephthalic acid and 2,6-naphthalenedicarboxylic acid and units of a sulfobenzenedicarboxylic acid and repeating units derived from a dihydric alcohol ingredient which comprise ethylene glycol units, triethylene glycol units, and units of an adduct of bisphenol A with ethylene oxide.

13. The electrophotographic image-receiving film as claimed in claim 12, wherein the repeating units derived from a dibasic acid ingredient comprise from 60 to 95 mol % units of at least one dicarboxylic acid selected from the group consisting of terephthalic acid and 2,6-naphthalenedicarboxylic acid and from 5 to 17 mol % units of a sulfobenzenedicarboxylic acid, and the repeating units derived from a dihydric alcohol ingredient comprise from 10 to 60 mol % ethylene glycol units, from 30 to 90 mol % triethylene glycol units, and from 5 to 40 mol % units of an adduct of bisphenol A with ehtylene oxide.

14. The electrophotographic image-receiving film as claimed in claim 12, wherein the repeating units derived from a dibasic acid ingredient comprise from 60 to 95 mol % terephthalic acid units, from 0 to 35 mol % isophthalic acid units, and from 5 to 17 mol % sulfobenzenedicarboxylic acid units.

15. The electrophotographic image-receiving film as claimed in claim 12, wherein the repeating units derived from a dibasic acid ingredient comprise from 0 to 35 mol % isophthalic acid units, from 60 to 95 mol %, 2,6-naphthalenedicarboxylic acid units, and from 5 to 17 mol % sulfobenzenedicarboxylic acid units.

16. The electrophotographic image-receiving film as claimed in claim 12, wherein the repeating units derived from a dibasic acid ingredient comprise from 0 to 90 mol % terephthalic acid units, from 0 to 35 mol % isophthalic acid units, from 10 to 90 mol % 2,6-naphthalene-dicarboxylic acid units, and from 5 to 17 mol % sulfobenzenedicarboxylic acid units.

17. The electrophotographic image-receiving film as claimed in claim 1, wherein the image-receiving layer has a surface resistivity as measured at 25° C. and 65% RH of from $1\times10^{10}$ to $1\times10^{14}$ Ω.

18. The electrophotographic image-receiving film as claimed in claim 1, wherein the image-receiving layer has a thickness of from 1 to 8 $\mu$m.

19. The electrophotographic image-receiving film as claimed in claim 1, wherein the transparent support comprises poly(ethylene terephthate).

20. The electrophotographic image-receiving film as claimed in claim 1, wherein the electrophotographic image-receiving film further comprises an electro-conductive layer between said image-receiving layer and said support.

* * * * *